(No Model.)
J. M. GILMOUR.
COUPLING.
No. 425,171. Patented Apr. 8, 1890.
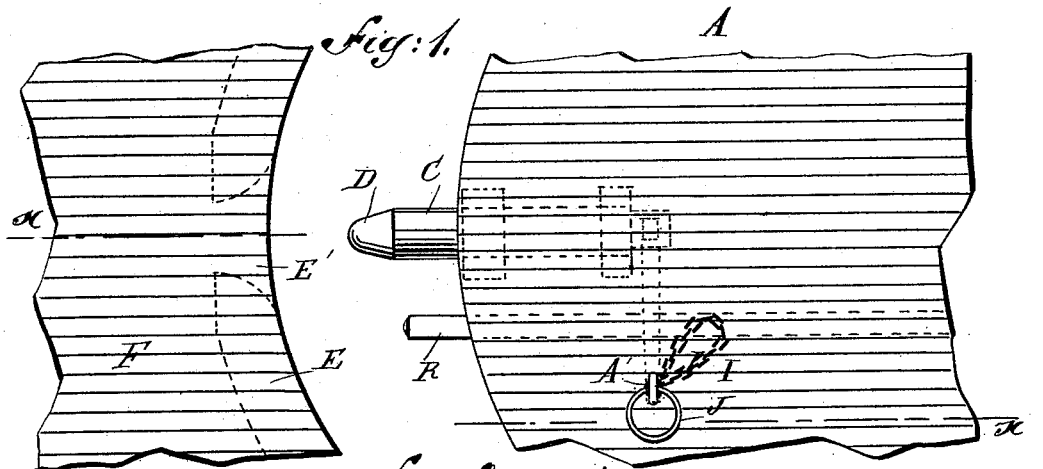
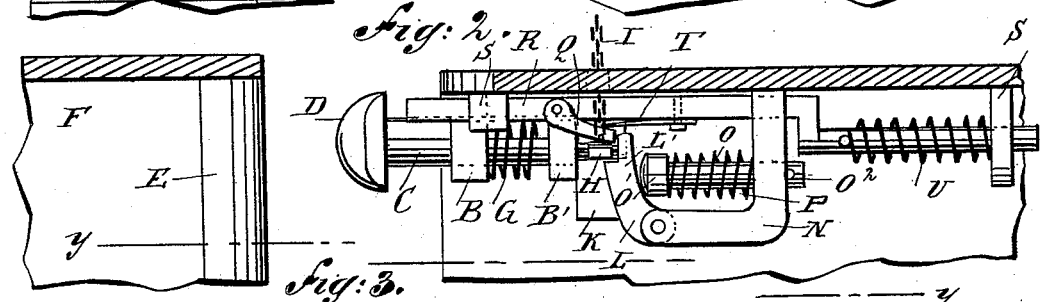
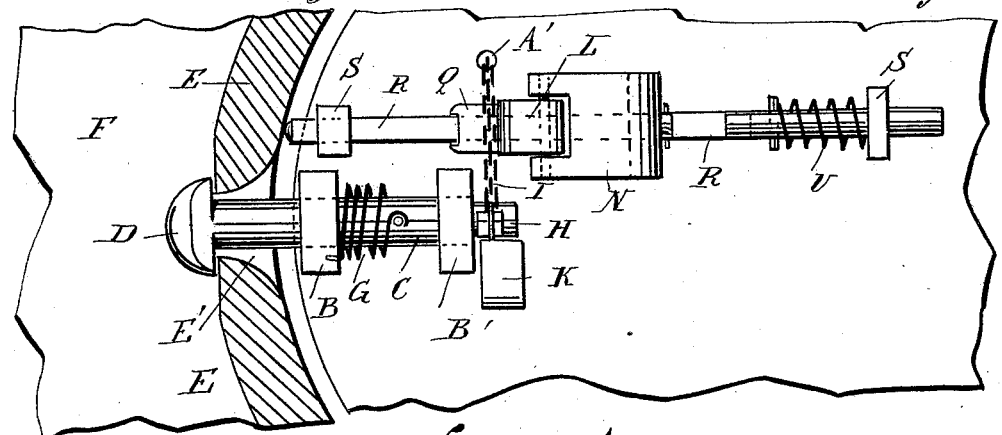
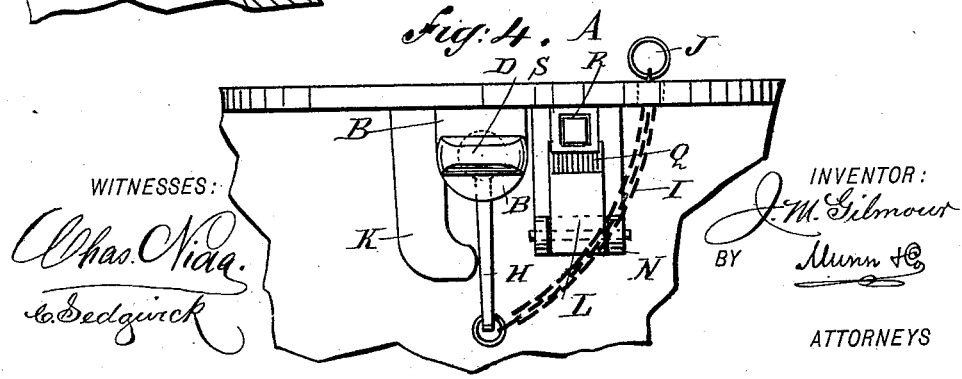
WITNESSES:
Chas. Nida.
C. Sedgwick.
INVENTOR:
J. M. Gilmour
BY Munn & Co.
ATTORNEYS

UNITED STATES PATENT OFFICE.

JAMES M. GILMOUR, OF EAST ORANGE, NEW JERSEY.

COUPLING.

SPECIFICATION forming part of Letters Patent No. 425,171, dated April 8, 1890.

Application filed December 27, 1889. Serial No. 335,116. (No model.)

*To all whom it may concern:*

Be it known that I, JAMES M. GILMOUR, of East Orange, in the county of Essex and State of New Jersey, have invented a new and Improved Coupling, of which the following is a full, clear, and exact description.

The object of the invention is to provide a new and improved coupling which may be used on railroad-cars, but is more especially designed for automatically coupling ferry-boats to their slips.

The invention consists of a spring-pressed bolt having a head and mounted to turn in bearings on the boat, and in setting and releasing devices for placing the bolt in position and automatically releasing it when the boat enters the slip.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a plan view of the improvement as applied. Fig. 2 is a sectional side elevation of the same on the line $x$ $x$ of Fig. 1. Fig. 3 is an inverted sectional plan view of the same on the line $y$ $y$ of Fig. 2, and Fig. 4 is an end view of the improvement.

As shown in the drawings, the coupling is applied to a ferry-boat A; but it may be adapted by slight changes in construction for use on railroad-cars and other vehicles. On the under side of the ferry-boat A, at each end, is mounted to turn in suitable bearings B and B' the bolt C, which is provided on its outer end with an oblong head D, of a width about the same or somewhat less than the bolt C and longitudinally longer than the diameter of the bolt C, as is plainly shown in Fig. 2. This bolt C and its head D, when standing in a vertical position, are adapted to pass into a vertically-arranged slot E', formed in the middle of the plate E, extending downward from the outer curved end of the slip F, of any suitable construction. The bolt C projects such a distance from the front end of the boat A that when the ferry-boat has entered the slip F the bolt C has passed in the slot E' and is then turned, and then the head D engages with its projections the inside of the plate E at each side of the slot E', so as to lock the ferry-boat A firmly to the slip F.

On the bolt C, between the bearings B and B', is coiled a spring G, fastened by one end to the said bolt and by its other end to one of the bearings B or B', so that when the bolt C is turned, as hereinafter more fully described, said spring G is compressed, and when the bolt is released said spring causes the bolt to turn back to its normal position.

On the inner end of the bolt C is secured an arm H, connected at its free end with a chain or rope I, extending upward and to one side of the said bolt and passing through an aperture A' in the floor of the ferry-boat A. On the upper end of the chain or rope I is secured a ring J, adapted to rest on the top of the floor of the ferry-boat A, and of such size as not to pass through the opening A'. The movement of the arm H is limited in one direction by a post K, secured to the under side of the floor of the ferry-boat A. (See Fig. 4.)

When the arm H is thrown into a horizontal position, as shown in Fig. 2, its free end is adapted to be engaged by a shoulder L', formed on an arm L, pivoted in a bracket N, secured on the under side of the floor of the ferry-boat A. In the bracket N is mounted to slide longitudinally a headed bolt O, pressed outward by a spring P, coiled on the said bolt, and resting with one end on the head of the bolt and with its other end on the bracket N. The head O' of the bolt O presses against the arm L, so as to hold the latter in an outward position to be ready to engage the arm H, as previously mentioned. The outward motion of the bolt O is limited by a stop-pin $O^2$, held on its rear end and adapted to engage the bracket N. The free end of the pivoted arm L is also adapted to be engaged by a pawl Q, pivoted to a bar R, mounted to slide in suitable bearings S, arranged on the under side of the floor of the ferry-boat A. The bar R projects slightly from the end of the ferry-boat A at one side of the bolt C, and is adapted to engage the plate E, secured on the slip F, previously described. A spring T is fastened on the under side of the bar R, and presses with its free end on the free end of the pawl Q, so as to engage the latter with the arm L. On the inner end of the bar R is coiled a spring U, pressing with one end on one of the bearings S and with its other end on a shoulder of or a pin secured to the bar R.

The operation is as follows: When the ferry-boat A is on its way from one slip to another, the bolt C stands in the position shown in Figs. 1 and 2—that is, the head D stands vertically, so as to readily pass into the vertical slot E' in the plate E of the slip F. In order to move the bolt C into its position, the operator on the floor of the ferry-boat pulls on the ring J, so that the chain I, acting on the arm H, swings the latter into a horizontal position, thus giving a quarter-turn to the bolt C to move the latter into the position shown in Figs. 1 and 2. When the operator pulls on the ring J, the arm H in swinging upward passes over the front of the arm L, and finally drops into the notch L', thus being locked in place, the pawl Q also engaging the upper end of the said arm L. Now, when the ferry-boat passes into the slip, the head D and the bolt C stand in the position to freely pass into the slot E', and when the outwardly-projecting end of the bar R is pressed in contact with the plate E by the ferry-boat A moving into the slip then the said bar R is forced rearward, compressing the spring U, and by the pawl Q swings the pivoted arm L rearward, so that the shoulder L' of the said arm is disengaged from the arm H and the latter is free to swing downward into a vertical position. This downward movement of the arm H and the consequent turning of the bolt C are accomplished by the action of the spring G, which was compressed when the lever H was swung into a horizontal position, as above described. The bolt C thus makes a quarter-turn; but the bolt C and its head D have passed into the slot E', whereby the head D now stands horizontal and engages the inside of the plate E, thus locking the ferry-boat to the slip F. It will be seen that the bar R remains in an innermost position, and the free end of its pawl Q passes over the free end of the pivoted arm L, thereby resetting the arm L; but when it is desired to uncouple the ferry-boat A from the slip F the operator pulls on the ring J, so as to swing the arm H upward and impart a quarter-turn to the bolt C to move the head of the latter into a vertical position. The bolt C, with its head D, can then pass out of the slot E' when the ferry-boat leaves the slip. The upward motion of the arm H acts on the pivoted arm L, slightly moving the same rearward to engage the shoulder L', as previously described, the said pivoted arm L being pressed outward by the spring-pressed bolt O. When the ferry-boat A leaves the slip, the bar R is forced outward by the spring U, and the free end of the pawl Q again engages the upper end of the pivoted arm L, so as to be ready to again trip the latter, as above described.

It will thus be seen that the ferry-boat is securely and automatically locked to its slip F, and it can be readily uncoupled and the bolt C reset, as above described.

Having thus fully described my invention, I claim as new and desire to secure by Letters Patent—

1. In a coupling, the combination, with a rotary bolt provided with a catching-head, of a setting mechanism in the path of a part of the bolt for holding it against axial movement and a releasing device to throw the setting mechanism and release the bolt for axial movement, substantially as set forth.

2. In a coupling, the combination, with a rotary bolt provided with a catching-head and an actuating-spring, of a setting pawl or dog in the path of a part of the said bolt to hold it from axial movement against the torsional action of the spring and a releasing bar or arm parallel with the bolt and having an arm or pawl to throw the setting pawl or dog and thereby release the bolt, substantially as set forth.

3. In a coupling, the combination, with a spring-pressed bolt having a catching-head and mounted to turn, of a locking device for holding the said bolt against axial movement, with its head in vertical position, and a plate having a vertical slot to receive the said bolt, substantially as shown and described.

4. In a coupling, the combination, with a spring-pressed bolt having a catching-head and mounted to turn, of a locking device for holding the said bolt against axial movement, with its head in vertical position, a plate having a vertical slot to receive the said bolt-locking device, and a releasing device connected with the said bolt to throw the latter and release the bolt to permit its head to engage the said slotted plate, substantially as shown and described.

5. In a coupling, the combination, with a spring-pressed bolt having a catching-head and mounted to turn, of an operating-arm connected with the said bolt and a pivoted arm having a shoulder in the path of and adapted to lock the said operating-arm in place, substantially as shown and described.

6. In a coupling, the combination, with a spring-pressed bolt having a catching-head and mounted to turn, of an operating-arm connected with the said bolt, a pivoted arm having a shoulder in the path of and adapted to lock the said operating-arm in place, and a chain connected with the said arm to move the latter in contact with the said pivoted arm, substantially as shown and described.

7. In a coupling, the combination, with a spring-pressed bolt having a catching-head and mounted to turn, of an operating-arm connected with the said bolt, a pivoted arm having a shoulder in the path of and adapted to lock the said operating-arm in place, and a releasing-pawl into the path of which the pivoted arm projects and adapted to engage the said pivoted arm to move the latter out of contact with the said arm, substantially as shown and described.

8. In a coupling, the combination, with a spring-pressed bolt having a catching-head and mounted to turn, of an operating-arm connected with the said bolt, a pivoted arm having a shoulder in the path of and adapted to lock the said operating-arm in place, a releasing-pawl into the path of which the pivoted arm projects and adapted to engage the said pivoted arm to move the latter out of contact with the said arm, and a spring-pressed bar mounted to slide parallel with the bolt and carrying the said pawl, substantially as shown and described.

9. In a coupling, the combination, with a spring-pressed bolt having a catching-head and mounted to turn, of an operating-arm connected with the said bolt, a pivoted arm having a shoulder in the path of and adapted to lock the said operating-arm in place, a releasing-pawl into the path of which the pivoted arm projects and adapted to engage the said pivoted arm to move the latter out of contact with the said arm, a spring-pressed bar mounted to slide parallel with the bolt and carrying the said pawl, and a slotted plate adapted to be engaged by the said bolt and the said bar, substantially as shown and described.

JAMES M. GILMOUR.

Witnesses:
 THEO. G. HOSTER,
 C. SEDGWICK.